(12) United States Patent
Esrich

(10) Patent No.: US 7,748,538 B2
(45) Date of Patent: Jul. 6, 2010

(54) HOLDER FOR PET FOOD BOWLS AND DISHES AND A KIT FOR MAKING SAID HOLDER

(76) Inventor: Michael J. Esrich, 917 S. 8th St., Philadelphia, PA (US) 19147

( * ) Notice: Subject to any disclaimer, the term of this patent is extended or adjusted under 35 U.S.C. 154(b) by 0 days.

(21) Appl. No.: 12/476,692

(22) Filed: Jun. 2, 2009

(65) Prior Publication Data

US 2010/0038512 A1 Feb. 18, 2010

Related U.S. Application Data

(60) Provisional application No. 61/088,870, filed on Aug. 14, 2008.

(51) Int. Cl.
*A01K 5/00* (2006.01)
(52) U.S. Cl. .............. 206/577; 119/51.01; 119/61.54; 220/4.31
(58) Field of Classification Search .............. 119/61.56, 119/51.01, 61.5, 61.54; 220/4.28, 4.29, 4.31, 220/4.32, 7; 206/576, 577, 449
See application file for complete search history.

(56) References Cited

U.S. PATENT DOCUMENTS

| 1,698,355 | A | * | 1/1929 | Wiemer | ...................... | 119/72 |
|---|---|---|---|---|---|---|
| 4,532,891 | A | | 8/1985 | Jones | | |
| 4,658,759 | A | | 4/1987 | Brown | | |
| 4,917,047 | A | * | 4/1990 | Wazeter, III | ................ | 119/474 |
| 4,981,108 | A | | 1/1991 | Faeroe | | |
| 5,133,291 | A | * | 7/1992 | Justice | ................... | 119/51.01 |
| 5,445,110 | A | | 8/1995 | Birnie | | |
| 5,485,806 | A | | 1/1996 | Watanabe | | |
| 5,560,316 | A | | 10/1996 | Lillelund et al. | | |
| 5,743,210 | A | | 4/1998 | Lampe | | |
| 5,794,565 | A | | 8/1998 | Beshah | | |
| 5,857,428 | A | | 1/1999 | Gitzen | | |
| 5,967,356 | A | * | 10/1999 | Laarhoven et al. | ............. | 220/6 |
| 7,017,518 | B2 | | 3/2006 | Zolnierz et al. | | |
| 7,155,865 | B2 | * | 1/2007 | Rosenberg | .................. | 52/79.9 |
| 2008/0190372 | A1 | | 8/2008 | Horvath | | |

* cited by examiner

*Primary Examiner*—Jacob K Ackun, Jr.

(57) ABSTRACT

A kit for making a holder for a pet food dish or bowl and the holder itself. The holder is arranged to be readily initially assembled from the kit and once assembled to be disassembled and reassembled whenever desired. The holder comprises a base member having an upstanding peripheral sidewall, a pair of side splash-guard members and a rear splash-guard member. The side splash-guard members are arranged to be releasably mounted on respective portions of the peripheral sidewall opposite each other. The rear splash-guard member is arranged to be releasably mounted on another respective portion of the peripheral sidewall between the side splash-guard members. The base member has a bottom wall on which the at least one pet food dish or bowl may be disposed.

6 Claims, 2 Drawing Sheets

HOLDER FOR PET FOOD BOWLS AND DISHES AND A KIT FOR MAKING SAID HOLDER

CROSS-REFERENCE TO RELATED APPLICATIONS

This application claims priority from U.S. Provisional Application Ser. No. 61/088,870, filed on Aug. 14, 2008, entitled Holder For Pet Food Bowls and Dishes And A Kit For Making Said Holder, whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to holding devices and more particularly for devices for holding pet food dishes and bowls which can be readily assembled and disassembled.

BACKGROUND OF THE INVENTION

The feeding of domestic pets, such as dogs and cats, can be a somewhat messy endeavor inasmuch as it is commonly undertaken by placing the animal's feeding dish or bowl on the floor in the pet owner's residence. Accordingly, solid food particles and/or liquids can find their way to the floor or on adjacent walls, furniture, etc. The use of trays, mats or other items placed under the animal's bowl may tend to reduce the problem, but does not eliminate it.

Various pet feeding devices have been disclosed in the patent literature, such as U.S. Pat. No. 4,532,891 (Jones); U.S. Pat. No. 4,658,759 (Brown); U.S. Pat. No. 4,981,108 (Faeroe); U.S. Pat. No. 5,445,110 (Birnie); U.S. Pat. No. 5,485,806 (Watanable); U.S. Pat. No. 5,560,316 (Lillelund et al.); U.S. Pat. No. 5,743,210 (Lampe); U.S. Pat. No. 5,794,565 (Beshah); U.S. Pat. No. 5,857,428 (Gitzen); U.S. Pat. No. 7,017,518 (Zolnierz et al.) and 2008/190372A1 (Horvath). While those devices appear generally suitable for their intended purposes, they still leave something to be desired from the various standpoints of simplicity of construction, each of assembly and disassembly, cleanability, and functionality. Accordingly, a need exists for a device for holding a pet food bowl or dish to enable the animal to freely eat from the bowl or dish, while putting up a barrier to the egress onto adjacent surroundings, yet which can be readily disassembled for cleaning and then readily reassembled for renewed usage. The subject invention addresses that need.

SUMMARY OF THE INVENTION

In accordance with one aspect of the invention there is provided a kit for making a holder for a pet food dish or bowl and the holder itself. The holder is arranged to be readily initially assembled from the kit and once assembled to be disassembled and reassembled whenever such is desired. The holder basically comprises a base member having an upstanding peripheral sidewall, a pair of side splash-guard members and a rear splash-guard member. The side splash-guard members are arranged to be releasably mounted on respective portions of the peripheral sidewall of the base member so that the rear splash-guard members are spaced opposite each other. The rear splash-guard member is arranged to be releasably mounted on another respective portion of the peripheral sidewall of the base member between the side splash-guard members. The base member has a bottom wall on which the at least one pet food dish or bowl may be disposed.

In accordance with one preferred aspect of the invention the splash-guard members are generally planar panels and each comprises two slots for releasably securing the splash-guards to the base member and to each other.

DETAILED DESCRIPTION OF THE PREFERRED EMBODIMENT

Figure 1:
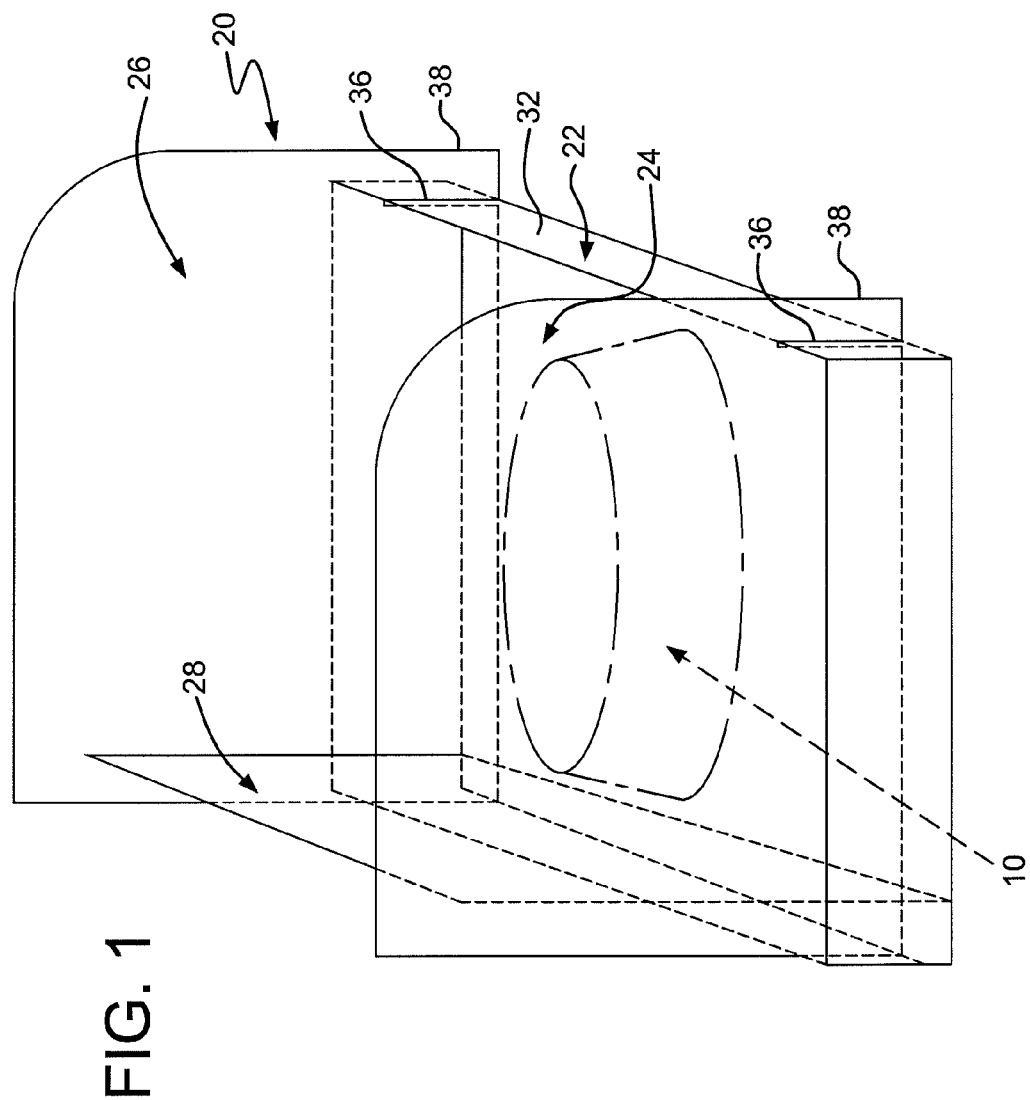
FIG. 1 is an isometric view of one exemplary holder for a pet food bowl or dish constructed in accordance with this invention and showing a typical pet food bowl or dish disposed therein.

Referring now to the various figures of the drawing wherein like reference characters refer to like parts, there is shown in FIG. 1 an assembled holder 20 for holding a pet food bowl or dish 10 to enable the animal to readily eat or drink from the bowl or dish, while preventing the food and/or water from gaining egress (e.g., splashing or otherwise spilling) from the holder to the surroundings. The holder 20 basically comprises a base member or catch-tray 22, a pair of side splash-guard members 24 and 26 and a rear splash-guard member 28. The base member 22 and the splash-guard members 24, 26 and 28 can be provided in the form of a kit, so that those components may be readily initially assembled into the holder 20 shown in FIG. 1.

The base member 22 is preferably an integral unit formed of a generally planar bottom panel or wall 30 and an upstanding peripheral sidewall 32. The bottom wall serves to receive the animal's feeding/drinking bowl/dish 10 thereon as shown in FIG. 1. The peripheral sidewall of the base member can be any height sufficient to prevent any food/liquid that spills or splashes out of the animal's bowl/dish from the exiting the base member. In the exemplary embodiment the height of the sidewall 32 is at least 3 inches (7.6 cm), but can be shorter or taller depending upon the size of the animal to be fed. The base wall 30 can be of any shape, e.g., rectangular as shown in the exemplary embodiment of FIG. 1. Moreover, the base wall can be of any size, to accommodate the bowl or plural bowls, e.g., a food bowl and a water bowl.

The portions of the sidewall 32 making up its four sides can be individual members which are glued together or can be formed as an integral, one-piece unit, with or without the base wall 30. If desired, the base member 22 can be constructed so that its components can be readily disassembled and reassembled, if desired.

Figure 4:
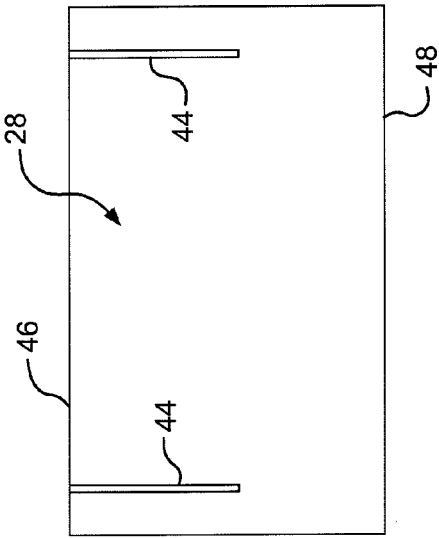
FIG. 4 is a reduced plan view of one of two identical side splash-guards making up a portion of the holder of FIG. 1.
Figure 5:
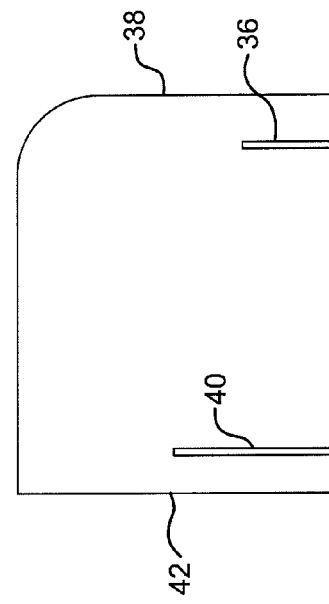
FIG. 5 is a reduced plan view of a back splash-guard making up a portion of the holder of FIG. 1.

Each of the side splash-guard members 24 and 26 basically comprises a generally planar panel of any shape and size. In the exemplary embodiment each side splash-guard is generally rectangular with one rounded corner as shown in FIGS. 1 and 4. The rounded corner provide protection against injury to the pet that might result from a sharp corner when the splash guard members are assembled to the base member (as will be described later). Each splash-guard member 24 and 26 also has a linear bottom edge 34.

Figure 2:
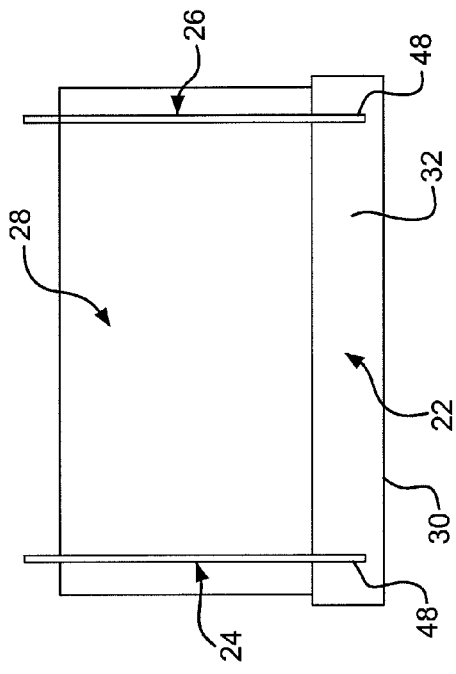
FIG. 2 is a reduced top view of the holder of FIG. 1.
Figure 3:
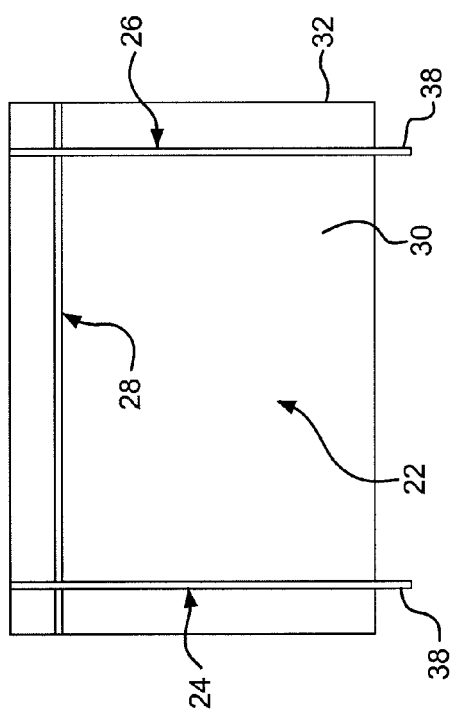
FIG. 3 is a reduced front view of the holder of FIG. 1.

As best seen in FIGS. 1 and 4, a slot 36 projects upward from the bottom edge 34 of the splash guard member 24 adjacent its front edge 38. A similar slot 36 projects upward from the bottom edge 34 of the splash guard member 26 adjacent its front edge 38. The slots 36 enable the side splash-guards to be connected to the base member, as will be described later. The height of the slots 36 is approximately equal to the height of the peripheral sidewall 32 since each slot 36 is adapted to receive a respective portion of the peripheral sidewall 32 to connect the side splash-guards 24 and 26 to the base member 22. As will be described later, when so assembled, the side splash-guards 24 and 26 are disposed opposite and confronting each other as shown in FIGS. 1-3.

The rear splash-guard 28 is arranged to be connected to the two confronting side splash-guard members 24 and 26 to form an assembly in the form of a generally U-shaped upstanding wall when viewed from the top. To that end, as best seen in FIG. 4 a slot 40 projects upward from the bottom edge 34 of the splash guard member 24 adjacent its rear edge 42. A similar slot 40 projects upward from the bottom edge 34 of the splash guard member 26 adjacent its rear edge 42. The slots 40 connect the rear splash-guard member 28 to the side splash-guard members 24 and 26 by receiving respective portions of the rear splash-guard 28 that are aligned with the slots 44 within the slots 40. In particular, the slot 40 in the side splash-guard 24 is arranged to be brought into engagement with one of the slots 44 in the rear splash-guard 28, while the slot 40 in the side splash-guard 26 is brought into engagement with the other of the slots 44 in the rear splash-guard 28.

In order to facilitate the releasable connection between the side splash-guards 24 and 26 and the rear splash-guard 28, the height of the slots 40 in the side splash-guards 24 and 26 is at least equal to half of the height of the rear splash-guard member 28.

With the side splash-guards 24 and 26 connected to the rear splash-guard 28, that splash-guard assembly (i.e., the generally U-shaped wall) can then be connected to the base member 22. In particular, the bottom edge 34 of the splash-guard member 24 can be disposed within the base member 22, with a portion of the front wall of the peripheral sidewall 32 disposed in the slot 36. In a similar manner, the bottom edge 34 of the splash-guard member 26 can be disposed within the base member 22, with another portion of the front wall of the peripheral sidewall 32 disposed in the slot 36. Thus, the two side splash-guard members 24 and 26 will be disposed opposite, parallel to and confronting each other on opposite sides of the base member 22 as best seen in FIGS. 1-3. This arrangement leaves the front of the assembled holder 20 open to provide the animal with free access to the interior of the holder 20 where its feeding/drinking bowl/dish 10 is disposed. Thus, the animal's bowl or dish 10 can be placed at any location on the base wall 30. As mentioned above, the holder may be sized to accommodate more than one bowl at a time, e.g., a food bowl and a water bowl. Any splashing of food or liquid from the bowl(s) 10 will thus be confined within the interior of the holder by the upstanding splash-guards.

In the interested of sanitation and cleanliness, the members making up the holder 20 are formed of a strong, yet readily cleanable material, e.g., plastic, but can be formed of other materials as well. Moreover, if desired, the splash guard members 24, 26 and 28 (or any one(s) of them) may be transparent to enable the holder 20 to visually blend into the surroundings in which it is located in the interest of aesthetics.

As will be appreciated by those skilled in the art, the holder can be cleaned in its assembled state. However, to do a complete and thorough cleaning, the holder is preferably disassembled by disconnecting its side splash-guards and rear splash-guard from it base, so that each can be individually cleaned. Once that has been accomplished the holder can be reassembled for renewed usage or can be readily packed away or otherwise stored until needed.

Without further elaboration the foregoing will so fully illustrate my invention that others may, by applying current or future knowledge, adopt the same for use under various conditions of service.

I claim:

1. A holder for at least one pet food dish or bowl, said holder being arranged to be readily assembled and disassembled when desired and comprising a base member, a pair of side splash-guard members and a rear splash-guard member, said base member having a bottom wall and an upstanding sidewall of constant height extending about the entire periphery of said bottom wall, each of said side splash-guard members comprising a planar panel having front edge, a rear edge, a first elongated slot located adjacent and extending parallel to said front edge and a second elongated slot located adjacent and extending parallel to said rear edge, said first slot being arranged for receipt of a respective portion of said peripheral sidewall of said base member, each of said side splash-guard members being arranged to be releasably mounted on respective portions of said peripheral sidewall of said base member via said first slot of said side splash-guard member so that said side splash-guard members are spaced opposite each other, said rear splash-guard member comprising a planar panel having first side edge, a second side edge, a first elongated slot located adjacent and extending parallel to said first side edge and a second elongated slot located adjacent and extending parallel to said second side edge, said first slot of said rear splash-guard member being arranged for engagement with said second slot of one of said side-splash guard members, said second slot of said rear splash-guard member being arranged for engagement with said second slot of the other of said side splash-guard members, said rear splash-guard member being arranged to be releasably mounted on another respective portion of said peripheral sidewall of said base member between said side splash-guard members, said bottom wall of said base member being arranged for receipt of at least one pet food dish or bowl thereon.

2. The holder of claim 1 wherein said base member is an integral, tray-like unit.

3. The holder of claim 1 wherein said holder is resistant to liquids.

4. A kit for assembling a holder for at least one pet food dish or bowl, said kit comprising a base member, a pair of side splash-guard members and a rear splash-guard member, said base member having a bottom wall and an upstanding sidewall of constant height extending about the entire periphery of said bottom wall, each of said side splash-guard members comprising a planar panel having front edge, a rear edge, a first elongated slot located adjacent and extending parallel to said front edge and a second elongated slot located adjacent and extending parallel to said rear edge, said first slot being arranged for receipt of a respective portion of said peripheral sidewall of said base member, each of said side splash-guard members being arranged to be releasably mounted on respective portions of said peripheral sidewall of said base member via said first slot of said side splash-guard member so that said side splash-guard members are spaced opposite each other, said rear splash-guard member comprising a planar panel having first side edge, a second side edge, a first elongated slot located adjacent and extending parallel to said first side edge and a second elongated slot located adjacent and extending parallel to said second side edge, said first slot of said rear splash-guard member being arranged for engagement with said second slot of one of said side splash-guard members, said second slot of said rear splash-guard member being arranged for engagement with said second slot of the other of said side splash-guard members, said rear splash-guard member being arranged to be releasably mounted on another respective portion of said peripheral sidewall of said base member between said side splash-guard members, said bottom wall of said base member being arranged for receipt of at least one pet food dish or bowl thereon once said kit is assembled into said holder.

5. The kit of claim 4 wherein said base member is an integral, tray-like unit.

6. The holder of claim 4 wherein said holder is resistant to liquids.

* * * * *